(No Model.)

W. P. HUSBAND.
SPINNING RING.

No. 273,090.        Patented Feb. 27, 1883.

WITNESSES:
C. Neveux
C. Sedgwick

INVENTOR:
W. P. Husband
BY Munn & Co
ATTORNEYS.

UNITED STATES PATENT OFFICE.

WILLIAM P. HUSBAND, OF HARTFORD, CONNECTICUT.

SPINNING-RING.

SPECIFICATION forming part of Letters Patent No. 273,090, dated February 27, 1883.

Application filed April 25, 1882. (No model.)

*To all whom it may concern:*

Be it known that I, WILLIAM P. HUSBAND, of Hartford, in the county of Hartford and State of Connecticut, have invented a new and useful Improvement in Spinning - Rings, of which the following is a full, clear, and exact description.

My invention relates to the rings used in spinning-machines; and it consists in a ring having a coating or covering of vitrified material, whereby a smooth glazed surface of extreme hardness and durability is obtained, as hereinafter described and claimed.

Reference is to be had to the accompanying drawings, forming a part of this specification, in which similar letters of reference indicate corresponding parts in both the figures.

Figure 1:
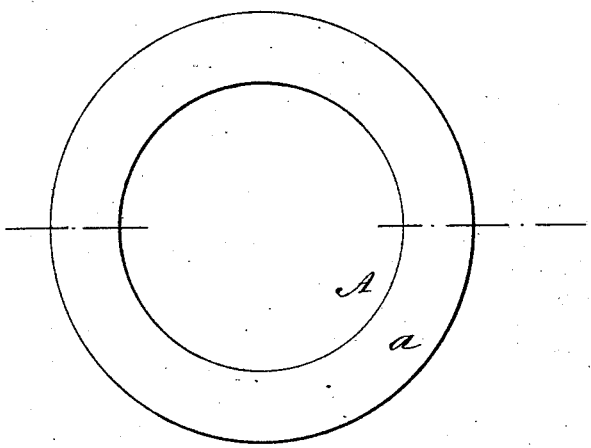
Figure 2:
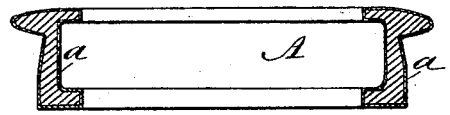

Figure 1 is a plan view, and Fig. 2 is a transverse section, of a spinning-ring of the type to which my improvement relates.

The ring A is made of any suitable metal or material, and of ordinary shape. For the coating or covering I use any suitable and vitrifiable composition—such, for instance, as pulverized feldspar and flint, in suitable proportions, mixed with water, and applied to the ring, which is subjected to heat sufficient to melt the said composition and glaze the ring.

The ring is thus given a smooth surface of extreme hardness, which will withstand the wear better than the steel rings usually employed.

*a* in the drawings represents the coating or covering, which, it will be seen, covers the whole surface of the ring.

I am aware that spinning-rings have heretofore been made of glass, and I therefore lay no claim to such construction, in which the rings are extremely liable to breakage. My ring possesses all the advantages of the glass spinning-rings as regards durability and friction, and at the same time is not liable to break, as the glass rings are; and I am also aware that a spinning-ring made of glass or glazed earthenware or porcelain, grooved in and around its shank or neck to receive a soft-metal ring, band, or re-enforce, has also been employed, and I therefore lay no claim to such invention, which is different from and more expensive than my construction and more liable to break; and I am further aware that spinning-rings have heretofore been made partly of metal, with guiding-surfaces only of glass, enamel, or similar material, and I therefore lay no claim, broadly, to such invention.

Having thus described my invention, I claim as new and desire to secure by Letters Patent—

As an improved article of manufacture, a spinning-ring having a metallic base and a surface of vitrified material, as set forth.

WILLIAM P. HUSBAND.

Witnesses:
HENRY E. TAINTOR,
THO. J. VAIL.